United States Patent [19]

Eroshkin et al.

[11] 4,187,410
[45] Feb. 5, 1980

[54] METHOD OF MULTI-PASS NARROW GROOVE ARC WELDING

[75] Inventors: Nikolai A. Eroshkin; Alfred V. Ivannikov; Vyacheslav N. Matveev, all of Leningrad; Anatoly I. Sergienko, Moscow, all of U.S.S.R.

[73] Assignee: Vsesojuzny Nauchno-Issledovatelsky, Proektno-Konstruktorsky i Tekhnologichesky Institut Elektrosvarochnogo Oborudova, Leningrad, U.S.S.R.

[21] Appl. No.: 776,198

[22] Filed: Mar. 10, 1977

[51] Int. Cl.² .............................................. B23K 9/00
[52] U.S. Cl. ................................... 219/137.2; 219/74; 219/137 R; 219/137.7
[58] Field of Search .................. 219/137 R, 74, 137.7, 219/137.2

[56] References Cited

U.S. PATENT DOCUMENTS

| | | | |
|---|---|---|---|
| 2,868,951 | 1/1959 | Shrubsall | 219/74 |
| 3,325,626 | 6/1967 | Sargent | 219/74 X |
| 3,328,556 | 6/1967 | Nelson et al. | 219/137 R |
| 3,350,539 | 10/1967 | Manz et al. | 219/137.7 |
| 3,509,314 | 4/1970 | Dreytag | 219/137.71 |
| 3,594,538 | 7/1971 | Broodman | 219/136 X |
| 3,649,805 | 3/1972 | Rohrberg | 219/137 R X |

FOREIGN PATENT DOCUMENTS 912660 10/1972 Canada ................................ 219/137 R Primary Examiner—E. A. Goldberg
Attorney, Agent, or Firm—Fleit & Jacobson

[57] ABSTRACT

A method of multi-pass arc welding with a consumable electrode in a protective atmosphere for welding heavy-gauge metal with narrow grooving, wherein, according to the invention the initial electrode extension is adjusted to be greater than the depth of grooving of welded joint, a current supply conductor which supports the consumable electrode passing therethrough is placed in a permanent position above the welded joint, and the welding is conducted with the length of extension of consumable electrode decreasing upon each pass, the voltage applied to the current supply conductor, rate of feed of the consumable electrode and welding speed being reduced with the decrease in the length of extension of the consumable electrode.

3 Claims, 3 Drawing Figures

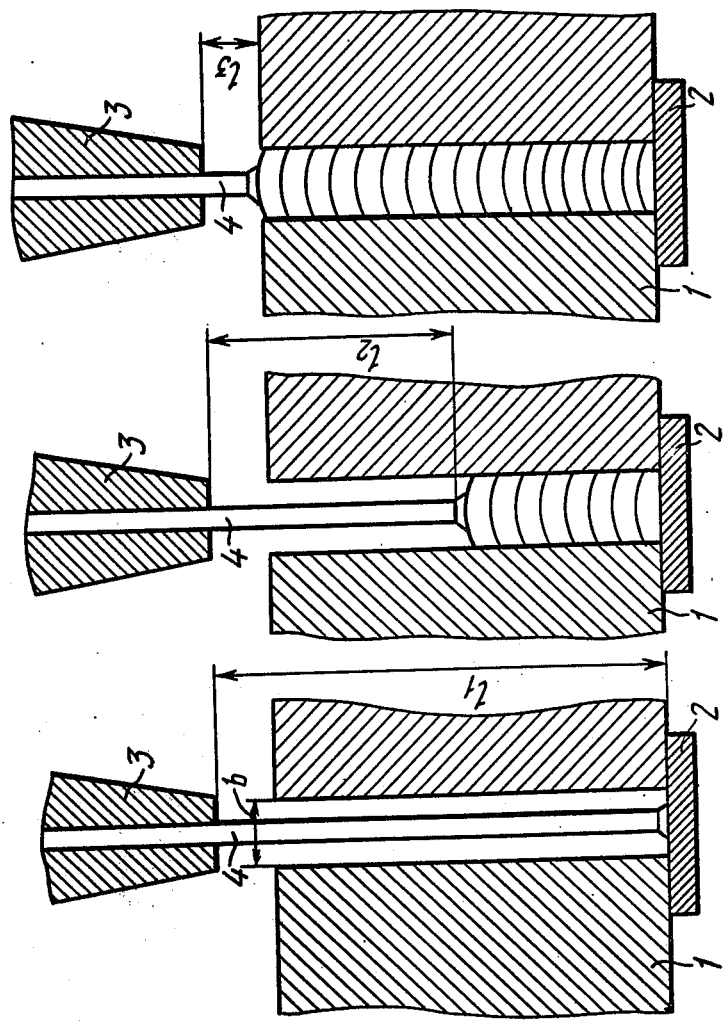

METHOD OF MULTI-PASS NARROW GROOVE ARC WELDING

The invention relates to the field of arc welding and more specifically to a method of multi-pass arc welding with a consumable electrode.

The invention may be used in the manufacture of welded structures of heavy-gauge steel and non-ferrous metals.

One of the important problems arising in the manufacture of welded structures of heavy-gauge steel and non-ferrous metals is the problem of reduction of weld section and also lowering of the amount of metal removed in preparing edges for welding and metal built-up in the grooving during welding.

Known in the art is a method of welding heavy-gauge metal with V-grooving.

By this method, the edges of slabs (sheets or plates) to be welded are machined at the entire thickness at an angle $\alpha$ (up to 30°) with respect to the vertical line drawn to the slab surface. When the two slabs thus prepared are butt joined on a special bed or stand by placing them with the prepared edges facing each other so as to form the V-grooving for welding with a total angle equal to $\alpha + \alpha = 2\alpha$. An electrode in the form of fusible metal wire is introduced into the resultant grooving.

Voltage from a welding supply source is applied to the slabs being welded through the stand and to the consumable electrode, via a current supply conductor which supports the electrode passing therethrough. Welding arc is ignited, e.g. by contacting the electrode with the slabs being welded, and welding is conducted by displacing the electrode along the grooving made as described above to fuse the slab edges being welded and to build-up a metal layer up to 4–5 high.

With heavy-gauge slabs, the welding is conducted in several passes to fill the grooving at the entire thickness with individual layers. After each pass, the welding process is interrupted, the current supply conductor is lifted at a height equal to the thickness of the built-up layer so as to maintain a constant distance between the end of the electrode, at which the arc is ignited, and the point of application of voltage to the electrode (which is referred to as electrode extension) during application of each layer.

The above-described method is convenient for welding operations. It is, however, noted that as the thickness of the material being welded increases, the weld section is materially increased.

The amount of metal removed in preparing the edges for welding and metal built-up in the grooving during welding (Q) is, in effect, proportional to the second power of thickness of the material being welded ($\delta$):

$$Q = \delta^2 tg\alpha$$

wherein $\delta$, which represents metal thickness, is in the second power.

It is also known to weld heavy-gauge metal with double-V grooving.

By this method, the edges of slabs being welded are machined on either side at one half of the thickness at an angle $\alpha$ up to 30° with respect to a vertical line drawn to the slab surface. Then the two slabs thus prepared are butt joined on a special bed or stand by placing them with their prepared edges facing each other so as to define a double-V grooving with a total angle on either side equal to $\alpha + \alpha = 2\alpha$. Welding is effected in turn on either side. Welding on each side is completely similar to the above-described process of welding with V-grooving. Volume of metal removed during preparation of edges for welding and metal built-up in the grooving during welding is twice as small as for V-grooving. This welding method is, however, only applicable in cases where both sides of an article being welded are accessible.

It is known to weld heavy-gauge metal with U-grooving with an angle $\alpha$ of 10°–15°.

With such a method, the edges of slabs being welded are machined over the entire thickness at an angle $\alpha$ (up to 15°) with respect to a vertical line drawn to the slab surface the weld root being generally rounded with a radius up to 5 mm. Then the two slabs thus prepared are butt joined on a special bed or stand with their prepared edges facing each other so as to define U-grooving with a total angle equal to $\alpha + \alpha = 2\alpha$ up to 30° and with the weld root radius of 5 mm. Welding with such grooving is completely similar to the welding process described above for V-grooving.

Amount of metal removed in preparing the edges for welding and metal built-up in the weld grooving during welding is smaller in this case than with V-grooving or double-V grooving. The preparation of edges for welding is, however, more complicated due to more intricate shape thereof, while filling of the grooving during welding becomes more difficult as the access of the electrode to the grooving is less convenient.

Known in the art is a method of welding with a so called narrow grooving with an angle $\alpha = 0°$.

With this method, the edges of slabs being welded are machined at the entire thickness at an angle 90° with respect to the slab surface. Then the two slabs thus prepared are butt joined on a special bed or stand by placing them with the machined edges facing each other with a certain gap "b," the amount of gap depending on the thickness of slabs being welded; thus, with the slab thickness of 100 mm, the gap is of 13 mm. Welding with this grooving is completely similar to the above-described welding process using V-grooving.

With such method of welding, the amount of metal removed during preparation of the edges for welding and metal built-up in the grooving is the smallest as compared with the above-described welding methods with V-grooving, double-V-grooving and U-grooving, and this amount of metal does not materially increase with an increase in the metal thickness because the amount of metal is determined by the relationship:

$$A = \delta \cdot f$$

wherein b, which represents the metal thickness, is in the first power (rather than in the second power as is the case with the above-described welding methods); b is the amount of gap which is first constant and then changes to a small extent with an increase in thickness.

The disadvantage of the last-mentioned method resides in that it is the most difficult for welding, because as differed from the above-described welding methods, the formation of layers in this case occurs in a space defined by three surfaces, and the layer of a multi-pass weld should be fused with all these surfaces.

This imposes more stringent requirements on the accuracy of reproduction of welding performance parameters (welding current intensity, arc voltage, welding speed and rate of feed of electrode wire) as compared to the above-described methods. In addition, it is necessary to more accurately maintain constant the electrode wire extension than with the above-described welding methods with V-grooving, double-V grooving and U-grooving which are characterized by free formation of layers. This is due to the fact that welding voltage ($U_1$) is a resultant voltage of two components: voltage drop ($U_e$) across the electrode extension, that is along the portion of the electrode between the current supply conductor and the arc and voltage drop across the arc ($U_a$), that is $U_1=U_e+U_a$ depends on the length of extension, so that to maintain $U_a$ with $U_1$=const., the amount of electrode extension should be kept constant.

The last-mentioned method is also deficient in unproductive time losses for lifting the current supply conductor upon each pass and in the need of providing the welding apparatus with a vertical displacement mechanism which makes the welding apparatus very complicated, especially where welding process is to be automated.

It is an object of the invention to eliminate the above-mentioned disadvantages.

Another object of the invention is to provide a method of multi-pass arc welding with a consumable electrode in a protective atmosphere for welding heavy-gauge metal with narrow grooving which enables the process conduct with an improved productivity and does not require re-adjustment of the vertical position of the current supply conductor upon transition from one layer to another in filling multi-layer welded joint.

The above objects are accomplished by that in a method of multi-pass arc welding with a consumable electrode in a protective atmosphere for welding heavy-gauge metal with narrow grooving, wherein the initial length of extension of the consumable electrode is adjusted to be greater than the depth of grooving of welded joint, and a current supply conductor which supports the consumable electrode passing therethrough is placed above the welded joint, according to the invention, welding is conducted with the length of extension of the consumable electrode decreasing upon each pass, with the vertical position of the current supply conductor remaining unchanged, the voltage applied to the current supply conductor, rate of feed of the consumable electrode and welding speed being reduced with the decrease in the length of extension of the consumable electrode.

The welding method according to the invention enables simplification of the welding process and welding apparatus used therefor, since control and adjustment of the process are effected only with respect to the electrical parameters which are readily controllable and can be automated using simple electronic control systems thus completely eliminating the need of controlling the electrode extension which is very difficult for control and automatic maintenance during multipass welding.

The invention will now be described in details with reference to the accompanying drawings, in which:

FIG. 1 shows the initial position of the current supply conductor, electrode and welded edges during welding of the first (bottom) layer;

FIG. 2 shows relative position of the current supply conductor, electrode and welded edges by the time when one half of the weld grooving is filled;

FIG. 3 shows relative position of the current supply conductor and welded edges during the ultimate (top) pass.

The method of multi-pass arc welding consists in that the edges of slabs 1 (FIG. 1) to be welded are machined at the entire thickness at an angle of 90° with respect to the surface of the slab 1. Then the two slabs 1 thus prepared are butt joined on a special bed or stand to place them with the machined edges facing each other with a certain gap "b," the amount of gap depending on thickness of the slabs 1 being welded; thus, with the thickness of the slabs 1 of 100 mm, the gap is equal to 13 mm. To facilitate application of the first layer and ignition of arc, a chilled steel or copper pad 2 is used. A current supply conductor 3 is placed above the slabs 1 being welded to support a consumable electrode 4 passing therethrough. The consumable electrode 4 which may comprise fusible metal wire is introduced into the resultant grooving, the initial length of the electrode extension $l_1$ being adjusted to be by at least 10 mm smaller than the depth of the narrow grooving. Welding is conducted in a protective atmosphere.

Voltage from a welding supply source (not shown) is applied to the slabs 1 being welded through the stand, and to the consumable electrode 4, via the current supply conductor 3 supporting the consumable electrode 4 passing therethrough. Welding arc is ignited, e.g. by contacting the consumable electrode 4 with the pad 2, and welding is effected by displacing the consumable electrode 4 along the grooving to fuse the edges of the slabs 1 being welded and to build-up a metal layer of up to 4–5 mm high.

With a large thickness of the slabs 1, welding is effected in several passes to fill the grooving with individual layers at the entire thickness of the slabs 1.

Multi-pass welding with narrow grooving in accordance with the method of the invention is continuously effected until the whole grooving section is filled-up. It should be noted that with a closed joint configuration (such as with a circular joint), welding is effected continuously in one direction. Where the joint is of open configuration (such as, straight joint), the direction of the welding speed is reversed upon each pass without interrupting the welding process.

The above-mentioned procedure does not exclude the possibility of welding with interruptions after any number of layers are applied, in case where the above-described method of continuous filling of the weld grooving is undesirable or impossible for certain reasons (e.g. from the point of view of manufacturing process). It should be, however, noted that even in this case no re-adjustment of the electrode extension length is required.

As the narrow grooving is filled with metal layers, and the length of extension ($l_2$, $l_3$) of the consumable electrode 4 (FIGS. 2 and 3) spontaneously decreases, the arc voltage is maintained constant due to lowering of voltage applied to the current supply conductor 3 upon each pass or upon 2–6 passes, depending on required welding accuracy.

This requirements is due to the following. Welding voltage ($U_1$) is a resultant voltage of two components: voltage drop ($U_e$) across the extension of the consumable electrode 4 and voltage drop across the arc ($U_a$), that is $U_1=U_e+U_a$.

In welding with a constant length of electrode extension, the value of $U_1$ is constant.

In welding by the method according to the invention, the length of extension of the consumable electrode 4 decreases upon each pass which results, with $U_1=$ const., in a spontaneous increase in the component $U_a$. It is known that an increase in the arc voltage ($U_a$) results in its increased length. This may result in changes in the layer shape, excessive side wall fusion in the narrow grooving of the slabs 1 and in flaws. The component $U_a$ can be maintained constant with decreasing $U_e$ only by lowering the total welding voltage.

The welding voltage is lowered without interrupting the welding process.

The same is applied to the rate of feed of the consumable electrode 4 (which is reduced), because with a decrease in the length of extension of the consumable electrode 4 and with an increase in the number of layers, the degree of heating of the electrode with the Lentz-Joule heat decreases which results, with $I_1=$const. (welding current), in reduction of the fusion speed.

The reference is now made to some examples of welding.

EXAMPLE 1

Welding heavy-gauge steel of the slabs 1 of 50 mm thickness was effected with narrow grooving. A consumable electrode comprises steel wire of 3 mm diameter, protective atmosphere consisted of a gas mixture of Ar and $CO_2$ at 1:1 ratio.

The initial length of extension $l_1$ of the electrode 4 was 70 mm.

Welding current was $I_1=550-600$ A, welding voltage— $U_1=38-40$ V, rate of feed of the electrode $V_f=300-360$ m/h, welding speed $V_1=35-45$ m/h with a number of passes 10-12 to comply with the conditions of stable arcing and formation of welded joints with narrow grooving. Gas mixture flow rate was 1200-1400 l/h. Initial voltage was $U_1=40$ V; after the fourth pass the voltage was lowered to $U_1=39$ V; after the eighth pass the voltage was lowered to 38 V. The rate of feed of the consumable electrode 4 was lowered upon each pass in such a manner that current remained within the limits defined by a pre-set welding performance.

Study of macrosections of welded joints revealed good formation and quality of welds without cracks, voids and slag inclusions.

EXAMPLE 2

Welding of heavy-gauge steel slabs 1 of 100 mm thickness was effected with narrow grooving. The consumable electrode 4 comprised 4 mm steel wire; protective atmosphere consisted of a mixture of gases Ar and $CO_2$ in 1:1 ratio.

The initial length of extension of the electrode 4 was 130 mm.

Welding current was $I_1=650$ A, welding voltage $U_1=35-38$ V, rate of feed of the electrode 4 (steel wire) $V_f=100-120$ m/h, welding speed $V_1=30-35$ m/h, number of passes 20-23 to comply with the conditions of stable arcing and weld formation in narrow grooving. Gas mixture flow rate was 1400-1800 m/h. The initial voltage was $U_1=38$ V; the voltage after the sixth pass was lowered to $U_1=37$ V; the voltage was lowered to 36 V after the twelfth pass, and to 35 V after the eighteenth pass. Rate of feed of the consumable electrode 4 was lowered upon each pass in such a manner that the welding current remained within the limits of a pre-set welding performance. The welding speed was also lowered respectively.

Studies of macrosections of welded joints revealed good formation and quality of welds without cracks, voids and slag inclusions.

EXAMPLE 3

Welding was effected with narrow grooving of heavy-gauge steel slabs 30 mm thick. The consumable electrode 4 comprised 2 mm steel wire; protective atmosphere consisted of a gas mixture of Ar and $CO_2$ in 1:1 ratio.

The initial length of extension $l_1$ of the consumable electrode 4 was 40 mm.

Welding current was $I_1=360$ A, welding voltage was $U_1=30-27$ V, rate of feed of the consumable electrode 4 $V_f$ was within the range from 360 to 450 m/h, welding speed $V_1=30-40$ m/h, number of passes was 10-11. Protective gas mixture flow rate was 900-1200 l/h. The initial voltage was $U_1=30$ V; the voltage was lowered to 28 V after the fourth pass; and the voltage $U_1$ was lowered to 27 V after the eighth pass. The rate of feed of the electrode 4 was lowered upon each pass in such a manner that the welding current remained within the limit of a pre-set welding performance. The welding speed was lowered respectively.

Studies of macrosections of welded joints revealed good weld formation and quality without cracks, voids and slag inclusions.

What is claimed is:

1. A method of multi-pass arc welding with a consumable electrode in a protective atmosphere for welding heavy-gauge metal with narrow grooving comprising: placing a current supply conductor which supports the consumable electrode passing therethrough above said narrow grooving which will form the welded joint, and adjusting the initial length of extension of the consumable electrode to be greater than the thickness of said heavy-gauge metal which corresponds to the depth of said narrow grooving of the welded joint, conducting the welding plural passes with the length of extension of the consumable electrode continuously decreasing upon each pass, maintaining the vertical position of the current supply conductor relative to the top surface of said metal unchanged, the voltage applied to the current supply conductor, rate of feed of the consumable electrode and welding speed being reduced with the continuous decrease in the length of extension of the consumable electrode, whereby the current and voltage in the arc gap are maintained substantially constant.

2. The method of claim 1 including the further step of forming said narrow grooving by first machining the entire thickness of the edges of the joint being welded at an angle of approximately 90° with respect to the surface of the heavy-gauge metal.

3. The method of claim 2 including the further step of positioning the machined edges facing each other and being separated by a gap of predetermined width.

* * * * *